United States Patent [19]
Patten

[11] 3,988,538
[45] Oct. 26, 1976

[54] DIGITAL DATA SCRAMBLER AND DESCRAMBLER

[75] Inventor: Michael David Patten, Bishop Stortford, England

[73] Assignee: International Standard Electric Corporation, New York, N.Y.

[22] Filed: Feb. 26, 1975

[21] Appl. No.: 553,349

[30] Foreign Application Priority Data
Mar. 7, 1974 United Kingdom............... 10238/74

[52] U.S. Cl.......................... 178/22; 340/146.1 BE; 235/180
[51] Int. Cl.²....................... H04L 9/00; H04K 1/00
[58] Field of Search........................ 178/22; 331/78; 340/146.1 BE; 235/180, 153 BN

[56] References Cited
UNITED STATES PATENTS

| | | | |
|---|---|---|---|
| 3,452,328 | 6/1969 | Hsiao et al................. | 340/146.1 BE |
| 3,515,805 | 6/1970 | Fracassi et al........................ | 178/22 |
| 3,649,915 | 3/1972 | Mildonian, Jr........................ | 178/22 |
| 3,784,743 | 1/1974 | Schroeder............................ | 178/22 |

OTHER PUBLICATIONS
"Serial-to-Parallel Transformation of Linear-Feedback Shift-Register Circuits," Hsiao et al., IEEE Transactions on Electronic Computers, Dec. 1964, pp. 738-740.

*Primary Examiner*—Howard A. Birmiel
*Attorney, Agent, or Firm*—John T. O'Halloran; Alfred C. Hill

[57] ABSTRACT

A digital data scrambler and descrambler for $m$ parallel synchronized digital data streams, where $m$ is an integer greater than one, is disclosed. The scrambler and descrambler each include $m$ linear sequential filters, each of the $m$ filters being associated with a different one of the $m$ data streams. Each of the scrambler filters include a feedback path and tapping connections to the feedback path and each of the descrambler filters include a feedforward path and tapping connections to the feedforward path. The nature and location of the tapping connections of both the scrambler and descrambler filters are determined in accordance with a polynomial expression which is the same for a matched scrambler and descrambler.

15 Claims, 9 Drawing Figures

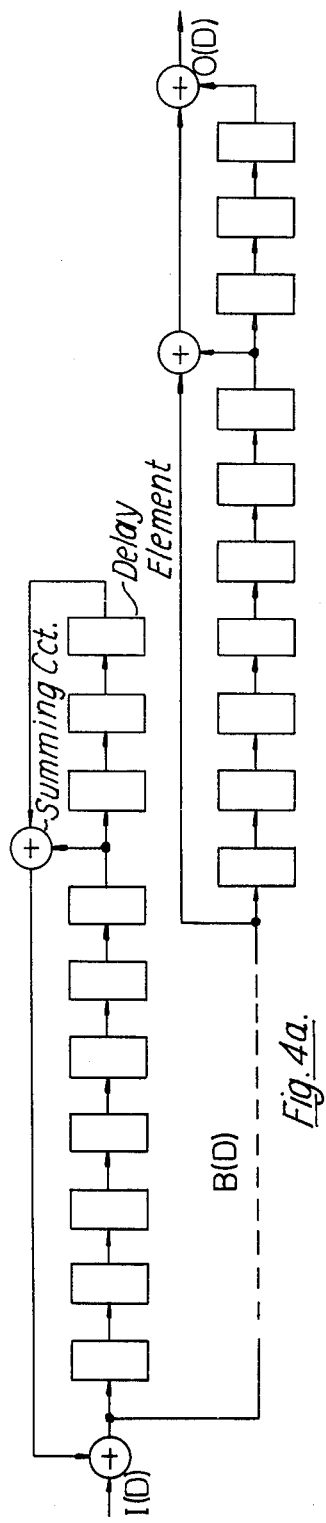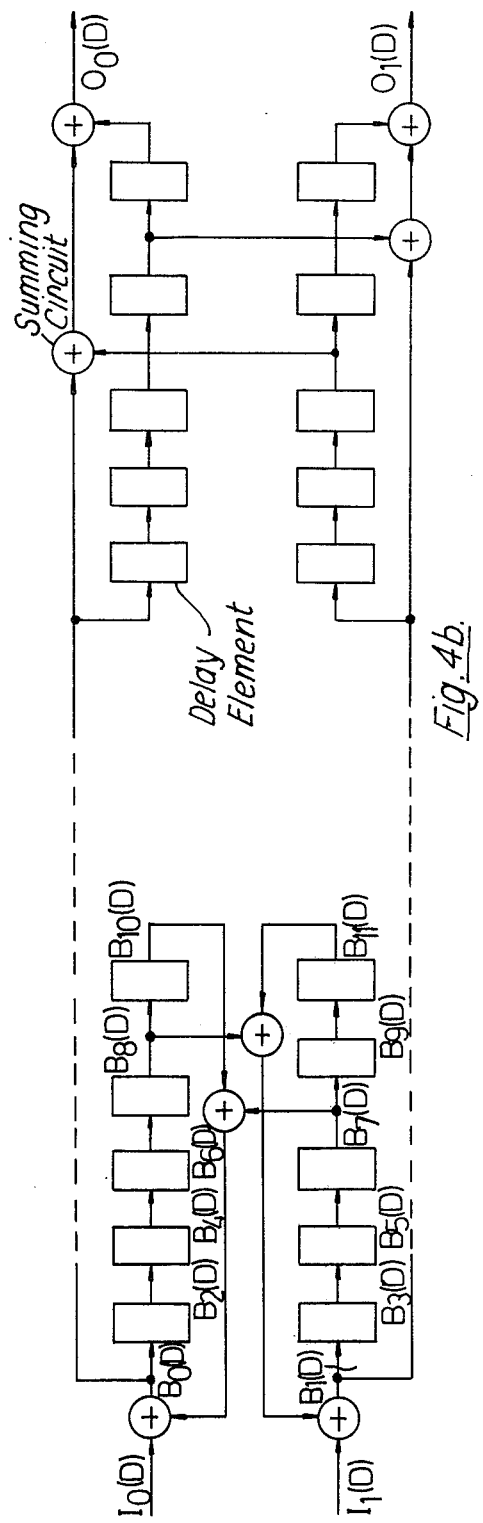
Fig. 4a.
Fig. 4b.

DIGITAL DATA SCRAMBLER AND DESCRAMBLER

BACKGROUND OF THE INVENTION

This invention relates to digital data transmission systems, and more particularly to scramblers and descramblers employed therein.

It is a requirement in many data transmission systems that the data to be transmitted, over repeatered lines for example, have certain well defined characteristics which are helpful in the design of the system, such as a suitable distribution of transitions under all normal conditions to aid in the recovery of clock rates from the incoming signals at the receiver.

Typically a data scrambler or descrambler comprises a linear sequential filter with feedback or feedforward paths, respectively, and tapping connections to the feedback or feedforward path, the nature and disposition of the tapping connections being determined in accordance with a polynomial expression which is the same for a matched scrambler and descrambler.

SUMMARY OF THE INVENTION

An object of the present invention is to provide a scrambler and a descrambler for $m$ parallel interdependent or independent synchronized binary coded digital data streams, where $m$ is an integer greater than one.

An example of interdependent digital data streams is the representation of multi-level digital data by a number of parallel binary streams, such as the representation of ternary data by two binary streams.

A case where it is desired to handle two or more independent digital data streams occurs in data multiplexing.

A feature of the present invention is the provision of in a digital data transmission system, the combination of a digital data scrambler comprising: $m$ inputs each associated with a different one of $m$ input synchronized binary coded data streams, where $m$ is an integer greater than one, first $m$ linear sequential filters each coupled to a different one of the $m$ inputs, a first given number of feedback paths coupled to each of the first $m$ filters from the output to the input of each of the first $m$ filters, and a first plurality of tap connections coupled between each of the first $m$ filters and associated ones of the feedback paths, the nature and disposition of the first tap connections being determined in accordance with a given polynomial having only binary coefficients, the given polynomial being used for each of the first $m$ filters but the sequence of the first tap connections of each of the first $m$ filters being shifted cyclically, with respect to the input of the first $m$ filters, from one of the first $m$ filters to the next of the first $m$ filters; and a digital data descrambler coupled to the scrambler to recover the $m$ input data streams comprising: second $m$ linear sequential filters each coupled to an output of different ones of the first $m$ filters, a second given number of feedforward paths coupled to each of the second $m$ filters from the input to the output of each of the second $m$ filters, the second given number being equal to the first given number, and a second plurality of tap connections coupled between each of the second $m$ filters and associated ones of the feedforward paths, the second plurality being equal in number to the first plurality, the nature and disposition of the second tap connections being determined in accordance with the given polynomial, the given polynomial being used for each of the second $m$ filters but the sequence of the second tap connections of each of the second $m$ filters being shifted cyclically the same as the sequence of the first tap connections.

Another feature of the present invention is the provision of a digital data scrambler for a digital data transmission system comprising: $m$ inputs each associated with a diffent one of $m$ input synchronized binary coded data stream, where $m$ is an integer greater than one; $m$ linear sequential filters each coupled to a different one of the $m$ inputs; a given number of feedback paths coupled to each of the $m$ filters from the output to the input of each of the $m$ filters; and a plurality of tap connections coupled between each of the $m$ filters and associated ones of the feedback paths; the nature and disposition of the tap connections being determined in accordance with a given polynomial having only binary coefficients, the given polynomial being used for each of the $m$ filters but the sequence of the tap connections of each of the $m$ filters being shifted cyclically, with respect to the input of the $m$ filters, from one of the $m$ filters to the next of the $m$ filters.

Still another feature of the present invention is the provision of a descrambler for a digital data transmission system to recover input digital data stream scrambled at a transmitter from the scrambled digital data streams received at a receiver comprising: $m$ inputs each associated with a different one of $m$ scrambled synchronized binary coded data streams, where $m$ is an integer greater than one; $m$ linear sequential filters each coupled to a different one of the $m$ inputs; a given number of feedforward paths coupled to each of the $m$ filters from the input to the output of each of the $m$ filters; and a plurality of tap connections coupled between each of the $m$ filters and associated ones of the feedforward paths; the nature and disposition of the tap connections being determined in accordance with a given polynomial having only binary coefficients, the given polynomial being used for each of the $m$ filters but the sequence of the tap connections being shifted cyclically, with respect to the input of the $m$ filters, from one of the $m$ filters to the next of the $m$ filters.

The principles involved in the application of polynomials, in which the coefficients are elements of $GF(q)$, to the generation and scrambling of data having $q$ levels, are well known. Any polynomial can be used in the generation and scrambling of data, but in order to generate a maximum length of sequence, or to scramble data such that the major autocorrelation function peaks are a maximum distance apart, for a particular degree of equipment complexity, it is necessary that the chosen generator polynomial should be both irreducible and primitive. Most of the past work has been limited to the case of binary data and tables of irreducible polynomials with binary coefficients have been compiled. A limited number of irreducible polynomials with ternary coefficients have been tabulated, but if larger coefficients, that is to say more data levels, are required, a suitable polynomial must be found.

In order to alleviate the complex and time consuming task of searching for a suitable polynomial, a means has been devised whereby polynomials with binary coefficients may be used in applications involving multi-level data. The multi-level data is presented in binary coded format at the input and output of the scrambler which can then be implemented with familiar logic elements. The input data will necessarily occupy $m$ input lines if it has more than $2^{(q-1)}$ levels and not more than $2^q$ levels, although some input states may be prohibited. The output however will occupy all $2^q$ possible states regardless of the number of input states. This is only a minor restriction however, as apart from ternary, which has irreducible polynomials already tabulated, most data have $2^q$ levels, because binary arithmetic elements are readily available. Alternatively, the input data may simply be two or more synchronous streams of unrelated data, which for convenience and economy are to be processed by a single scrambler.

The scrambled data which is generated must be processed by a compatible descrambler to recover the original data. With the scrambler described here it is possible for the data to undergo certain simple code translations during transmission to the descrambler, without the data being lost. One permissible translation is that in which a binary coded data word is split into two or more equal sized groups of bits to make new binary coded data words with less levels, and these are then transmitted in sequence beginning with the most significant group of the original data word. Another translation is the inverse operation in which two or more data words are assembled together to make a new data word. If it is necessary that the output data format from the descrambler be identical to the format at the input to the scrambler then the inverse of the translation must be done on the output of the descrambler. In all cases of translation the same generator polynomial must be used at the scrambler and descrambler.

BRIEF DESCRIPTION OF THE DRAWING

Above-mentioned and other features and objects of this invention will become more apparent by reference to the following description taken in conjunction with the accompanying drawing, in which:

FIGS. 4a and 4b are block diagams of scrambler and descrambler arrangements for a simple binary system and a quaternary system, respectively, using the polynomial $x^{10} + x^7 + 1$, in accordance with the principles of the present invention.

DESCRIPTION OF THE PREFERRED EMBODIMENT

Figure 1A:
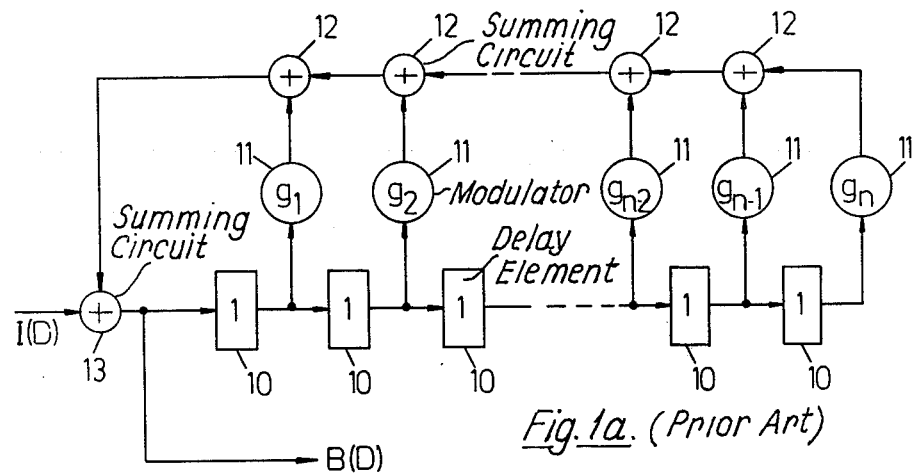
FIGS. 1a and 1b are block diagrams of a generalized binary scrambler and descrambler, respectively, known in the prior art.
Figure 1B:
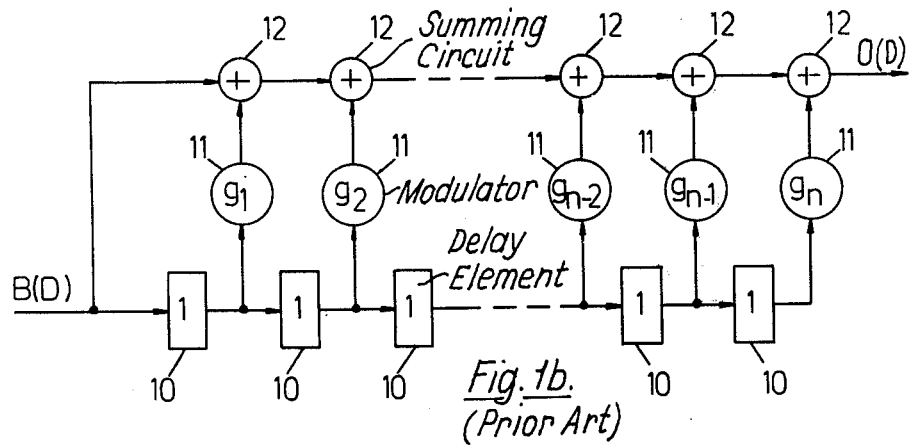

The generalized form of a conventional simple binary scrambler is shown in FIG. 1a, with the complementary descrambler shown in FIG. 1b. The scrambler comprises a series of delay elements 10 comprising a linear sequential filter, conveniently realized as a shift register, with tapping connections via modulators 11 to a feedback path. The outputs of modulators 11 are summed in summing circuits 12 and the feedback signal is summed with the input signal in summing circuit 13. The output of circuit 13 is applied to the input of the tapped delay line and is also the output of the scrambler. The descrambler is identical in every respect except that the feedback path is now a feedforward path. The input signal in this case is added to the summed modulator outputs and the output of the feedforward path is the descrambler output.

The input (I) D is a binary data stream defined by $$I(D) = \sum_{i=o}^{\infty} D^i i_i$$

where $i$ and $i_i$ are binary coefficients and D is the unit delay operator.

The output is defined by $$B(D) = \frac{I(D)}{G(D)} \qquad (1)$$

where $G(D)$ is the generator polynomial and is defined by $$G(D) = \sum_{i=o}^{n} D^i g_i \quad g_n \neq 0 \qquad (2)$$

where $i$ and $q_i$ are binary coefficients.

The descrambler output is defined by $$O(D) = G(D)B(D) \qquad (3)$$

where $G(D)$ and $B(D)$ are as defined previously. Eliminating the line signal $B(D)$ from equations (1) and (3) give the equality $$O(D) = I(D)$$

If the input $I(D)$ in equation (1) is a single "I" bit at a time zero, then $I(D) = 1$ and $$B(D) = \frac{1}{G(D)}$$

Thus, for a single impulse to begin operation, a bit stream can be generated to be used as a test signal for example. The bit stream so generated is repetitive, the longest possible pattern being $2^n - 1$ bits, where $n$ is the degree of the generator polynomial. It is necessary that the polynomial be irreducible and primitive in order that the longest pattern be generated.

Figure 2:
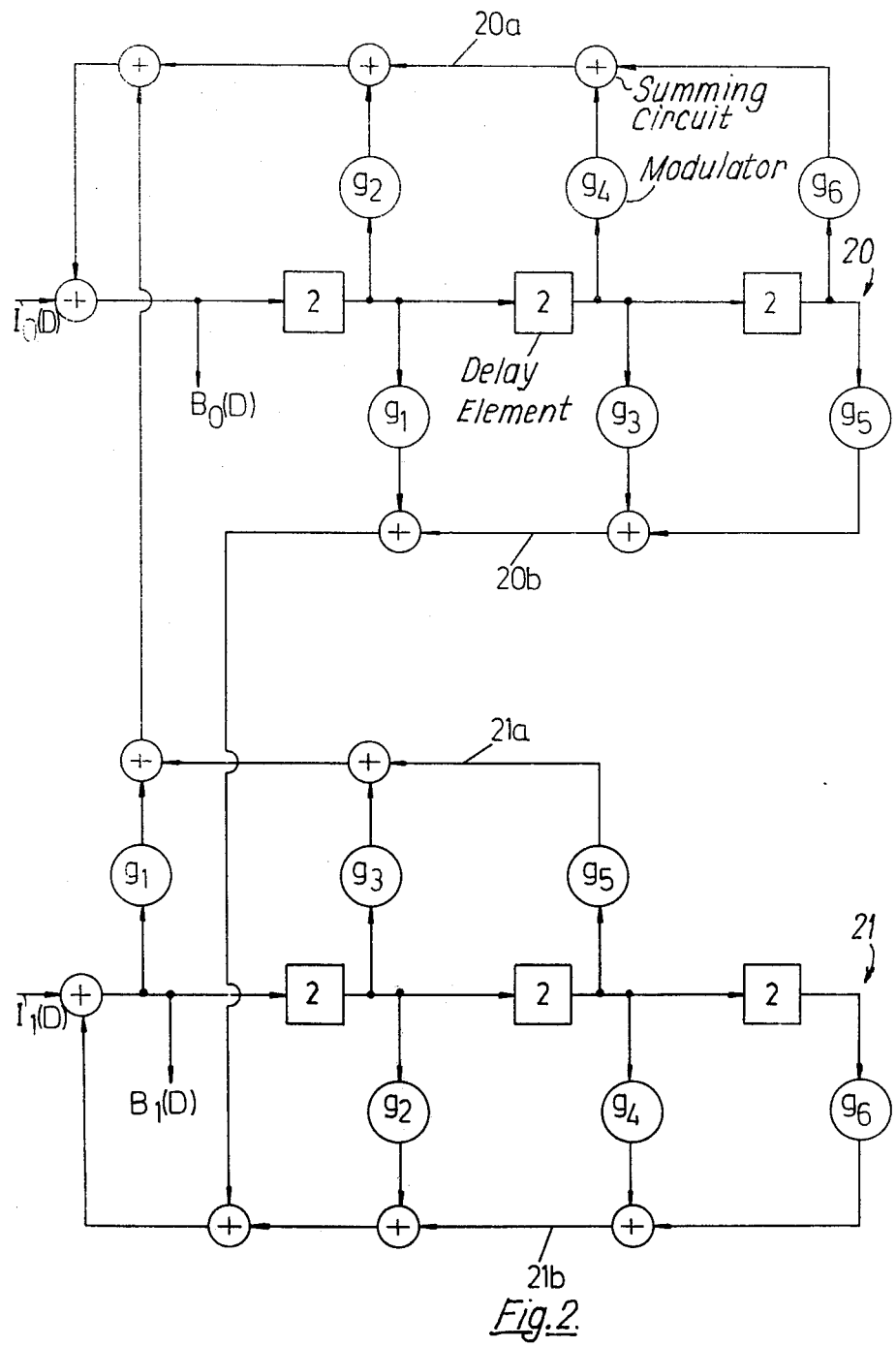
FIG. 2 is a block diagram of a simple scrambler for two binary data streams in accordance with the principles of the present invention.

The simple form of novel scrambler shown in FIG. 2 is designed to handle two synchronized binary data streams $I_o(D)$ and $I_1(D)$ simultaneously. Two linear sequential filters 20 and 21 are used, each having two feedback paths 20a and 20b, and 21a and 21b, respectively. Only 3-stage tapped delay lines are shown for simplicity, each element of the delay line introducing a delay of 2 units where one unit of delay is equivalent to the duration of one data bit, and the tapping connections to the pairs of feedback paths are in each case determined by a degree 6 polynomial having binary coefficients, e.g. $g_o......g_6$. The polynomial is used in the case of filter 20 with tapping connections from the filter to the feedback paths in the order shown. In the case of filter 21 the same polynomial is used, but the order of sequence of the tapping connections is shifted by one possible connection position with respect to the delay elements of the filter. The summed signals in feedback paths 20a and 21a are themselves summed and then summed with the input signal $I_0(D)$ to filter 20 while the signals of feedback paths 20b and 21b are summed together and then with the input signal $I_1(D)$ to filter 21. The output of the scrambler is two scrambled binary data streams $B_0(D)$ and $B_1(D)$. The descrambler is again identical with the exception of feedforward paths in place of feedback paths.

Figure 3A:
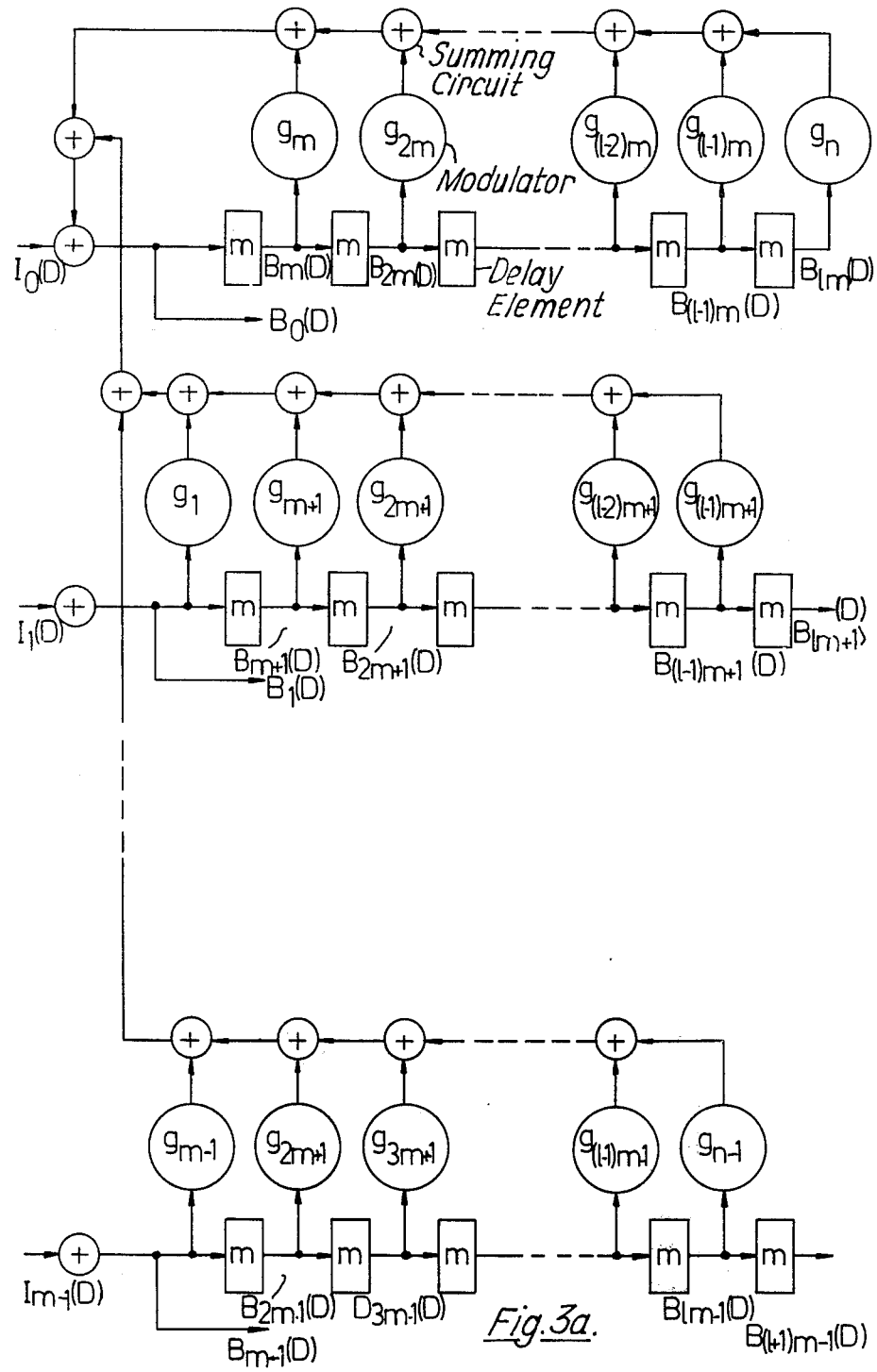
FIGS. 3a and 3b are block diagrams of a generalized multi-level scrambler and descrambler, respectively, in accordance with the principles of the present invention.

The general form of the multi-level data scrambler, using a generator polynomial with binary coefficients, is shown in FIG. 3a. It is an $m \times l$ array of delay elements, where $m \times l = n$ and $n$ is the degree of the generator polynomial. It should be noted that each element has $m$ units of delay to give the same information scrambling rate in bits/second.

Due to the complexity of the connections in the general case it has only been possible to show those connections required to produce the output $B_0(D)$. Given a generator polynomial as previously defined, the necessary connections to produce an output $B_k(D)$ are defined by $$B_k(D) = I_k(D) + B_{k+1}(D)g_1 + B_{k+2}(D)g_2 + \ldots + B_{lm+k}g_{lm}$$

$$= I_k(D) + \left\{ \sum_{i=0}^{l-1} \sum_{j=0}^{m-1} B_{im+j+k}(D)g_{im+j} \right\} - B_k(D)g_0 + B_{n+k}(D)g_n \quad (4-)$$

for $k=0$ to $m-1$

With the connections so defined, the outputs from the multi-level scrambler are $$\sum_{i=0}^{m-1} B_i(D)D^{m-1-i} = \frac{\sum_{i=0}^{m-1} I_i(D)D^{m-1-i}}{G(D)} \quad (5)$$

What this transfer function says, is that in order to determine the scrambled data, the input data must be transformed into a binary stream by serializing each word in turn of the binary coded multi-level data, with the bit at input $I_m(D)$ leading. This serial data is then scrambled as in a normal binary scrambler, and the resulting data converted into parallel form by using the inverse of the original transform.

Because of this compatibility between the binary and the multi-level data before and after scrambling, any sequence transform-scramble-transform, where the transformation consists only of multiplication or division of the number of information bits per scrambler data word by the previously described means, will result in the same scrambled data being generated if the same generator polynomial is used in each case.

Figure 3B:
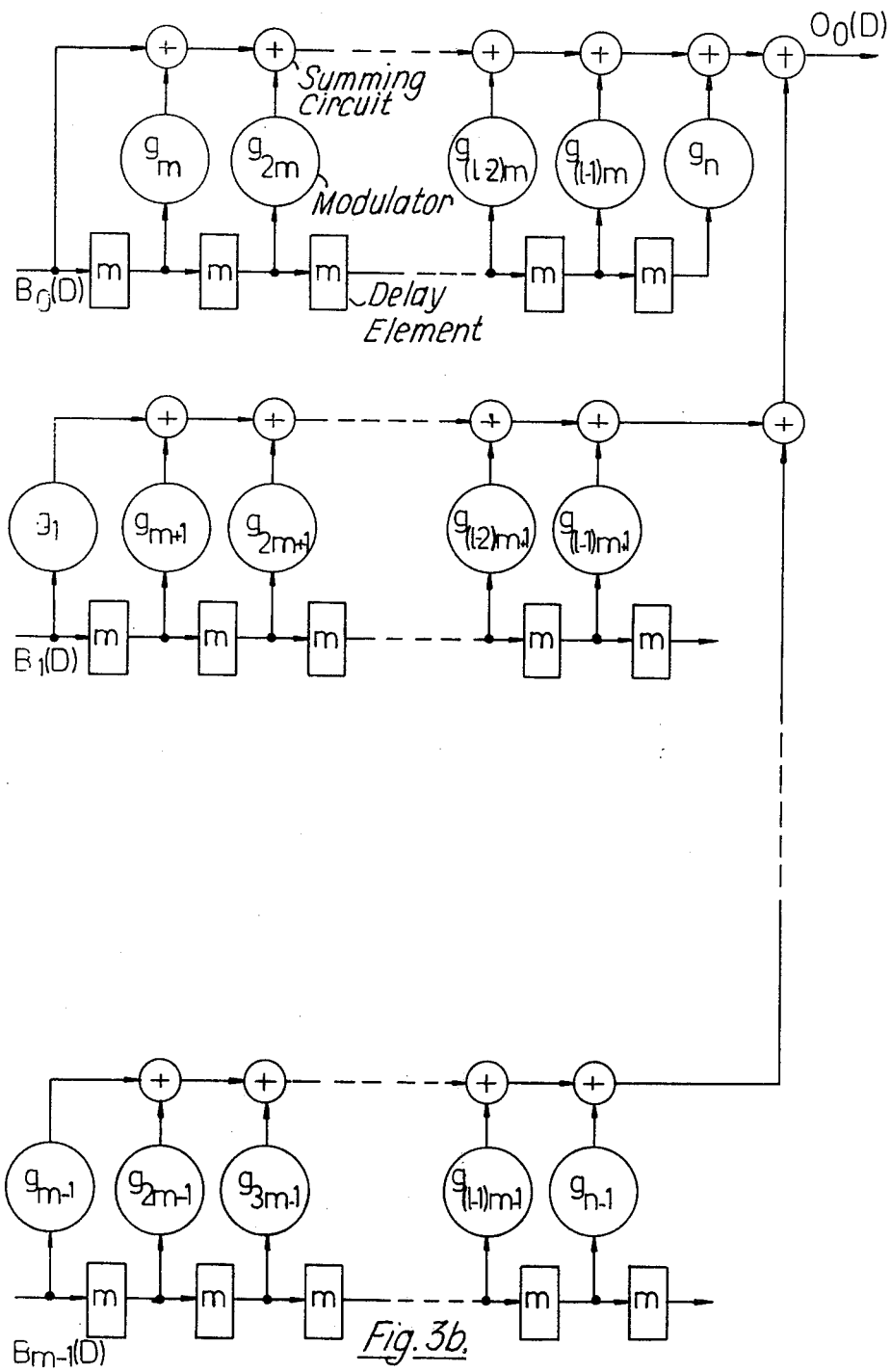

The descrambler required to recover the original data is shown in figure 3b. This descrambler bears the same relationship to the multi-level scrambler as a binary descrambler does to a binary scrambler in terms of multiplier and adder positions. Again complexity prevents all interconnections from being shown but those necessary for the generation of $O_0(D)$ — i.e. the recovery of $I_0(D)$ — are indicated. The full interconnections are defined by $$O_k(D) = B_k(D) + B_{k+1}(D)g_1 + B_{k+2}(D)g_2 + \ldots + B_{lm+k}(D)g_{lm}$$

$$= B_k(D) + \left\{ \sum_{i=0}^{l-1} \sum_{j=0}^{m-1} B_{im+j+k}(D)g_{im+j} \right\} - B_k(D)g_0 + B_{n+k}(D)g_n \quad (6)$$

for $k=0$ to $m-1$

With these connections so defined, and remembering that the coefficients in equations (4) and (6) are elements of GF(2), the sum of equations (4) and (6) gives $$O_k(D) + B_k(D) = B_k(D) + I_k(D)$$

so $O_k(D) = I_k(D)$ and the output of the descrambler is the same as the input to the scrambler. This output can also be defined in terms of the equivalent serial streams, as in the case of the scrambler, by $$\sum_{i=0}^{m-1} O_i(D)D^{m-1-i} = G(D) \sum_{i=0}^{m-1} B_i(D)D^{m-1-i} \quad (7)$$

This transfer function has the same significance as in the scrambler case, i.e. that any sequence transform-descramble-transform, where the transformation is restricted to that set previously defined, will result in the same output data if the same generator polynomial is used in each case. Extending this argument to a combination of scrambler and descrambler, it is clear also that any sequence transform-scramble-transform-descramble-transform subject to the previous restrictions will result, if the scrambler and descrambler use the same generator polynomial, in the input being reconstructed at the output. Hence, a scrambler and descrambler pair may use different values of $l$ and $m$ without the data being lost.

As with the binary scrambler, an input $$\sum_{i=0}^{m-1} I_i(D)D^{m-1-i} = 1$$

in equation (5) will result in a generated digit stream. Similarly the longest pattern producible is of $(2^m)^l - 1 = 2^n - 1$ digits, where $n$ is the degree of the generator polynomial, and wll occur only when $G(D)$ is irreducible and primitive.

Examples are shown in FIGS. 4a and 4b which use the generator $X^{10} + X^7 + 1$ to form in one case a 10 stage binary scrambler system, and in the second case a 5 stage quaternary scrambler system. An input $$\sum_{i=0}^{m-1} I_i(D)D^{m-1-i} = 1$$

is used in each case. From equation (1) the output of the binary scrambler must be $$B(D) = \frac{1}{D^{10} + D^7 + 1}$$

Using the binomial expansion and remembering that all coefficients are elements of GF(2)

$$B(D) = 1 + (D^7 + D^{10}) + (D^7 + D^{10})^2 + (D^7 + D^{10})^3 + (D^7 + \cdots$$

$$= 1 + (D^7 + D^{10}) + (D^{14} + D^{20}) + (D^{21} + D^{24} + D^{27} + D^{30}) + (D^{28} + \cdots$$

$$= 1 + D^7 + D^{10} + D^{14} + D^{20} + D^{21} + D^{24} + D^{27} + D^{28} + D^{30} + \cdots$$

Figure 5A:
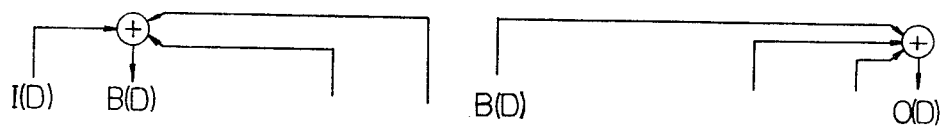
FIGS. 5a and 5b illustrate the processing of binary and quaternary data, respectively, with the polynomial $x^{10} + x^7 + 1$ in accordance with the principles of the present invention.

The bit by bit diagram of FIG. 5a shows that the scrambler in FIG. 4a does in fact produce this output. Also shown is a bit by bit diagram of the action of the complementary descrambler, showing that the input data is indeed reconstructed at the output.

Turning now to the quaternary case shown in FIG. 4b, the necessary interconnections can be generated here, whereas it was not possible to show all interconnections for the general multi-level scrambler.

The generator polynomial is $X^{10} + X^7 + 1$ and so from equatio (2) the values of $g_i$ are

| | |
|---|---|
| $g_0 = 1$ | $g_1 = 0$ |
| $g_2 = 0$ | $g_3 = 0$ |
| $g_4 = 0$ | $g_5 = 0$ |
| $g_6 = 0$ | $g_7 = 1$ |
| $g_8 = 0$ | $g_9 = 0$ |
| $g_{10} = 1$ | |

Equation (4) can be expanded with $m = 2$ $l = 5$ and $n = 10$ in this case for $k = 0$ (the (D)'s are omitted for clarity).

$$B_o = I_o + B_1 g_1 + B_2 g_2 + B_3 g_3 + B_4 g_4 + B_5 g_5 + B_6 g_6 + B_7 g_7 + B_8 g_8 + B_9 g_9 + B_{10} g_{10}$$

$$B_1 = I_1 + B_2 g_1 + B_3 g_2 + B_4 g_3 + B_5 g_4 + B_6 g_5 + B_7 g_6 + B_8 g_7 + B_9 g_8 + B_{10} g_9 + + B_{11} g_{10}$$

Figure 5B:
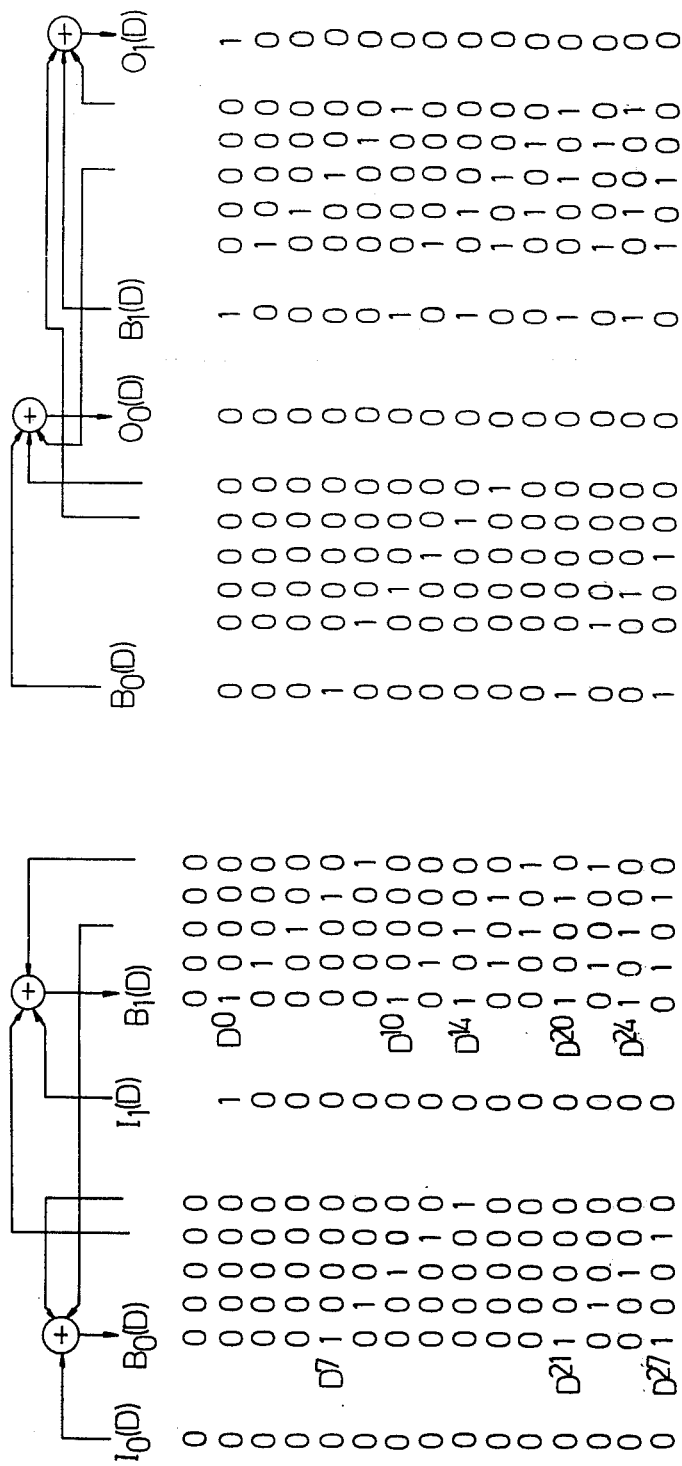

Substitution of the values of $g_i$ gives $$B_o = I_o + B_7 + B_{10}$$

$$B_1 = I_1 + B_8 + B_{11}$$

and these equations are used to determine the interconnections as shown in FIG. 4b. The output from the quaternary scrambler is similar to the binary case, and is found from equation (7) to be $$B_1(D)D + B_o(D) = 1 + D^7 + D^{10} + \cdots$$

and FIG. 5b shows this output from the scrambler. Again the operation of the descrambler in restoring the original data is shown.

The similarity of the line bit streams in these two cases demonstrates clearly the simple transformation required to convert between the two descramblers. With a degree 10 polynomial it would also have been possible to produce a 2 stage 32-level scrambler and descrambler, and again only simple translation is required to convert between all permissible mixed code schemes.

While I have described above the principles of my invention in connection with specific apparatus it is to be clearly understood that this description is made only by way of example and not as a limitation to the scope of my invention as set forth in the objects thereof and in the accompanying claims.

I claim:

1. In a digital data transmission sytem, the combination of a digital data scrambler comprising:

$m$ inputs each associated with a different one of $m$ input synchronized binary coded data streams, where $m$ is an integer greater than one, first $m$ linear sequential filters each coupled to a different one of said $m$ inputs, a first given number of feedback paths coupled to each of said first $m$ filters from the output to the input of each of said first $m$ filters, and a first plurality of tap connections coupled between each of said first $m$ filters an asociated ones of said feedback paths, the nature and disposition of said first tap connections being determined in accordance with a given polynomial having only binary coefficients, said given polynomial being used for each of said first $m$ filters with the sequence of said first tap connections of each of said first $m$ filters being shifted cyclically, with respect to the input of said first $m$ filters, from one of said first $m$ filters to the next of said first $m$ filters; and a digital data descrambler coupled to said scrambler to recover said $m$ input data streams comprising:

second $m$ linear sequential filters each coupled to an output of different ones of said first $m$ filters, a second given number of feedforward paths coupled to each of said second $m$ filters from the input to the output of each of said second $m$ filters, said second given number being equal to said first given number, and a second plurality of tap connections coupled between each of said second $m$ filters and associated ones of said feedforward paths, said second plurality being equal in number to said first plurality, the nature and disposition of said second tap connections being determined in accordance with said given polynomial, said given polynomial being used for each of said second $m$ filters with the sequence of said second tap connections of each of said second $m$ filters being shifted cyclically the same as the sequence of said first tap connections.

2. The combination according to claim 1, wherein said $m$ input data streams are parallel interdependent binary coded data streams.

3. The combination according to claim 1, wherein said $m$ data streams are parallel independent binary coded data streams.

4. The combination according to claim 1, wherein each of said first $m$ filters include
   a first shift register having a different tapping point for each of said first tap connections,
   each of said first tap connections include
   a first modulator coupled to one of said tapping points of said first shift register, and
   a first summing circuit coupled to said modulator and said feedback path, and
   each of said first modulators control the passage of signals from an associated one of said tapping points of said first shift register to said first summing circuit in accordance with the associated one of said binary coefficients of said given polynomial.

5. The combination according to claim 4, wherein each of said second $m$ filters include a second shift register having a different tapping point for each of said second tap connections, each of said second tap connections include
- a second modulator coupled to one of said tapping points of said second shift register, and
- a second summing circuit coupled to said second modulator and said feedforward path, and each of said second modulators control the passage of signals from an associated one of said tapping points of said second shift register to said second summing circuit in accordance with the associated one of said binary coefficients of said given polynomial.

6. The combination according to claim 1, wherein each of said second $m$ filters include
- a shift register having a different tapping point for each of said second tap connections, each of said second tap connections include
- a modulator coupled to one of said tapping points, and
- a summing circuit coupled to said modulator and said feedforward path, and each of said modulators control the passage of signals from an associated one of said tapping points to said summing circuit in accordance with the associated one of said binary coefficients of said given polynomial.

7. The combination according to claim 1, wherein each of said first $m$ filters and each of said second $m$ filters include
- $l$ stages, where $l$ is an integer greater than one, said given polynomial is an $n$ degree polynomial, where $n$ is an integer greater than one and $n = m \times l$, and
- each of said $l$ stages have $m$ units of delay, each of said $m$ units of delay being equivalent to the duration of one data bit.

8. A digital data scrambler for a digital data transmission system comprising:
- $m$ inputs each associated with a different one of $m$ input synchronized binary coded data stream, where $m$ is an integer greater than one;
- $m$ linear sequential filters each coupled to a different one of said $m$ inputs;
- a given number of feedback paths coupled to each of said $m$ filters from the output to the input of each of said $m$ filters; and
- a plurality of tap connections coupled between each of said $m$ filters and associated ones of said feedback paths;
- the nature and disposition of said tap connections being determined in accordance with a given polynomial having only binary coefficients, said given polynomial being used for each of said $m$ filters to determine the cyclic shifting of the sequence of said tap connections of each of said $m$ filters with respect to the input of said $m$ filters, from one of said $m$ filters to the next of said $m$ filters.

9. A scrambler according to claim 8, wherein said $m$ input data streams are parallel interdependent binary coded data streams.

10. A scrambler according to claim 8, wherein said $m$ input data streams are parallel independent binary coded data streams.

11. A scrambler according to claim 8, wherein each of said $m$ filters include
- a shift register having a different tapping point for each of said tap connections, each of said tap connections include
- a modulator coupled to one of said tapping points, and
- a summing circuit coupled to said modulator and said feedback path, and each of said modulators control the passage of signals from an associated one of said tapping points to said summing circuit in accordance with the associated one of said binary coefficients of said given polynomial.

12. A scrambler according to claim 8, wherein each of said $m$ filters include
- $l$ stages, where $l$ is an integer greater than one, said given polynomial is an $n$ degree polynomial, where $n$ is an integer greater than one and $n = m \times l$, and
- each of said $l$ stages have $m$ units of delay, each of said $m$ units of delay being equivalent to the duration of one data bit.

13. A descrambler for a digital data transmission system to recover input digital data stream scrambled at a transmitter from said scrambled digital data streams received at a receiver comprising:
- $m$ inputs each associated with a different one of $m$ scrambled synchronized binary coded data streams, where $m$ is an integer greater than one;
- $m$ linear sequential filters each coupled to a different one of said $m$ inputs;
- a given number of feedforward paths coupled to each of said $m$ filters from the input to the output of each of said $m$ filters; and
- a plurality of tap connections coupled between each of said $m$ filters and associated ones of said feedforward paths;
- the nature and disposition of said tap connections being determined in accordance with a given polynomial having only binary coefficients, said given polynomial being used for each of said $m$ filters with the sequence of said tap connections being shifted cyclically, with respect to the input of said $m$ filters, from one of said $m$ filters to the next of said $m$ filters.

14. A descrambler according to claim 13, wherein each of said $m$ filters include
- a shift register having a different tapping point for each of said tap connections, each of said tap connections include
- a modulator coupled to one of said tapping points, and
- a summing circuit coupled to said modulator and said feedforward path, and each of said modulators control the passage of signals from an associated one of said tapping points to said summing circuit in accordance with the associated one of said binary coefficients of said given polynomial.

15. A descrambler according to claim 13, wherein each of said $m$ filters include
- $l$ stages, where $l$ is an integer greater than one, said given polynomial is an $n$ degree polynomial, where $n$ is an integer greater than one and $n = m \times l$, and
- each of said $l$ stages have $m$ units of delay, each of said $m$ units of delay being equivalent to the duration of one data bit.

* * * * *